June 17, 1958     G. H. DE WITZ     2,839,678
COMBINED RADIO RECEIVER AND RADIATION ALARM
UTILIZING TRANSISTOR AS RADIO AMPLIFIER
AND RADIATION DETECTOR
Filed Oct. 4, 1954

GERHARD H. DeWITZ
*INVENTOR.*

BY

HIS ATTORNEY

United States Patent Office 2,839,678
Patented June 17, 1958

2,839,678

COMBINED RADIO RECEIVER AND RADIATION ALARM UTILIZING TRANSISTOR AS RADIO AMPLIFIER AND RADIATION DETECTOR

Gerhard H. De Witz, Los Angeles, Calif., assignor to Hoffman Electronics Corporation, a corporation of California Application October 4, 1954, Serial No. 459,881

3 Claims. (Cl. 250—20)

This invention is related to radio receivers, and more particularly, to an improved portable radio receiver in which at least one of the circuit components serves additionally as a detector of atomic radiation.

Radio receivers presently in use employ either vacuum tubes, transistors, or perhaps a combination of both. On the other hand, radiation detectors also use tubes or transistors in combination with a detecting device. For economical and practical reasons it is highly desirable to combine the detection of radiation with the detection of radio signals in one device, since both are needed for the protection of personnel and population. Immediately there is suggested the idea of simply providing a common housing for a radiation detector and a radio receiver, leaving the circuits separate. As shall hereinafter be explained, however, this is not economically feasible. It is necessary, therefore, to to combine compatible functions of the two circuits, so as to give, with a minimum of circuitry, audible and/or visual indication of the strength and presence of dangerous radiation while the device is fully and simultaneously operable as a radio receiver.

It is known that certain types of semi-conductors, for example photodiodes, are sensitive to light and X-ray radiations. Special types of transistors are also sensitive to light. Such transistors are termed "photo-transistors" and are generally known to those skilled in the art. Other transistors, while less sensitive to light radiation, are nevertheless highly sensitive to the alpha, beta and gamma radiation from fissionable materials. At the same time, these components are capable of either amplifying, conducting or modulating audio or high frequency oscillations.

Therefore, it is an object of this invention to provide apparatus which will serve simultaneously as a radio receiver and atomic radiation detector with a minimum of circuitry.

It is a further object of this invention to provide apparatus for translating electromagnetic and atomic radiation simultaneously which will be portable, compact, inexpensive, and will provide suitable means for audible and/or visual indication of the presence of nuclear radiation.

According to this invention, either a light sensitive circuit element encapsulated by a scintillation material, or a directly sensitive radiation detecting element is incorporated in the circuitry of a receiver and is positioned so as to have a maximum exposure to any nuclear radiation in the vicinity of the receiver. The presence of radiation will produce current pulses through the element which will be proportional in number to the intensity of the radiation. These pulses will create a distinctive noise in the audio output of the receiver. These noise pulses may be integrated to produce a visual indication of the radiation level, and also to produce an automatic volume control voltage which will reduce the audio output corresponding to radio signals. This circuit will insure that the signal from the dangerous radiation will override the output from radio reception. As an alternative to an automatic control system, the operator may simply de-tune the receiver to a quiet spot on the band or move a switch to suppress radio reception, in order to observe both audibly and visually the strength of the ambient radiation.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which;

Figure 1:
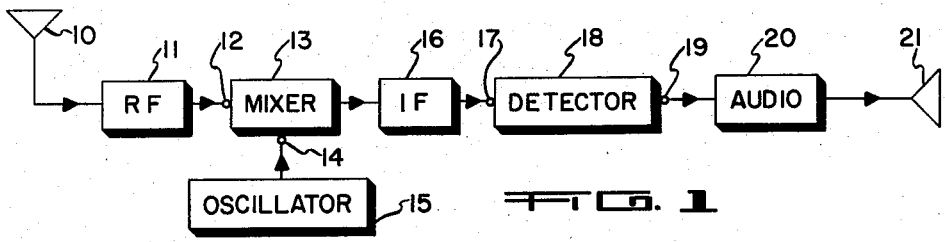
Figure 1 is a block diagram of a conventional radio receiver.

In Figure 1, antenna 10 is coupled through radio frequency amplifier section 11 to first input terminal 12 of mixer 13. To second input terminal 14 of mixer 13 is coupled local oscillator 15. The output of mixer 13 is coupled through intermediate frequency amplifier 16 to input terminal 17 of detector stage 18. Output terminal 19 of detector 18 is coupled through audio section 20 to loudspeaker 21. The radio receiver shown in Figure 1 is a conventional superheterodyne receiver. Radio frequency amplifier 11, mixer 13, and oscillator 15 are the most suitable points in the receiver circuit for the incorporation of radiation detecting circuitry. Thus, it remains only to consider the various radiation devices which may be employed. Suitable devices are indicated in Figures 2, 3 and 4.

Figures 2, 3, 4:
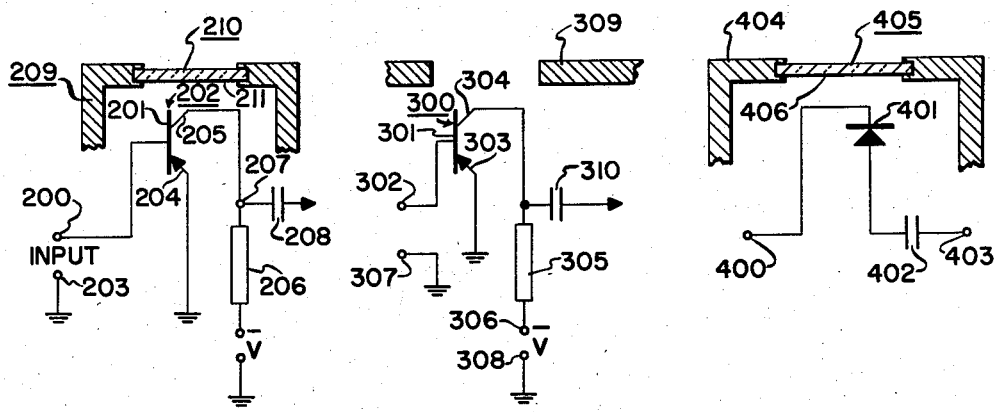
Figures 2, 3 and 4 are schematic diagrams (having partially sectional views) of atomic radiation detectors employable in the present invention.

In Figure 2 input terminal 200 is connected to base 201 of transistor 202. Input terminal 203 is maintained at ground potential, as is also emitter 204 of transistor 202. Collector 205 of transistor 202 is connected through collector load 206 to a source of voltage (V) of appropriate polarity. Output signals are taken from terminal 207 of collector load 206 through coupling capacitor 208. Physically, photo-sensitive transistor 202 is housed in probe 209 which has scintillating window 210. Radiation probe 209 may be appropriately disposed on or in the receiver cabinet or carrying case so that it may be exposed to any ambient radiation. Conceivably, there may be a window material which is strong enough so that the photo-sensitive transistor may be more completely exposed. Practically speaking, alpha radiation would not affect the well being of the observer since the extrapolated range of alpha particles in the air only amounts to somewhat less than 4.5 cm. (S. T. P.). However, for detecting soft beta radiation (soft betas having a stopping power of about 20 cm. in air (S. T. P.)), window 210 must necessarily be very thin, thus exhibiting a low stopping factor, and will be coated on the inside surface by an appropriate scintillation material. It should be understood that a window in conjunction with separate scintillation crystal may be employed in lieu of a coated window.

The circuit of Figure 2 operates as follows. Atomic radiation particles will progress through window material 210 to impinge upon scintillating surface 211, thereby producing flashes of light to which photo-sensitive transistor 202 will respond, by supplying current pulses the number of which corresponds to the number of impingements of nuclear particles upon scintillating layer 211. Transistor 202, in addition, may serve as the translating device of radio frequency amplifier section 11 (see Figure 1), the mixer 13, or of local oscillator 15. These radiation current pulses are subsequently passed through the intermediate frequency amplifier strip 16 and through the detector stage 18 to the audio portions of the receiver.

Hence, the presence of nuclear radiation will be indicated by noise at loudspeaker 21.

In Figure 3, radiation sensitive transistor 300 has its base 301 connected to input terminal 302, its emitter 303 connected to ground, and its collector 304 connected through load 305 to voltage terminal 306. Input terminal 307 and voltage terminal 308 are connected to ground. The receiver cabinet may be so designed that radiation sensitive transistor 300 protrudes, if desired, from the outer surface of receiver cabinet wall 309.

The circuit of Figure 3 operates as follows. The presence of nuclear radiation causes radiation sensitive transistor 300 to produce pulses which appear across load 305 as voltage pulses. These pulses, together with the radio signal being translated, are coupled through condenser 310 to the succeeding stage, and, as described with reference to Figure 2, ultimately to the audio section of the receiver, and produce noise in loudspeaker 21 (see Figure 1).

In Figure 4, input terminal 400 is coupled through photo-diode or photo-tube 401 and through coupling capacitor 402 (which may constitute a portion of an interstage coupling circuit) to output terminal 403. Probe 404 has radiation window 405 with scintillation backing material 406.

The circuit shown in Figure 4 may be connected in any convenient portion of the receiver circuitry, for example in one of the several coupling circuits, and operates as follows. Radiation particles travel through window 405 and impinge upon scintillating layer 406, producing the flashes of light to which photo-diode 401 is sensitive. Scintillations produce current pulses through photo-diode 401 and are fed through coupling capacitor 402, together with the radio signals which were applied to input terminals 400, to output terminal 403. The radio signals and radiation pulses are fed in conventional manner through the receiver to the audio section, these radiation pulses producing distinctive noise in the audio reproducer.

Figure 5:
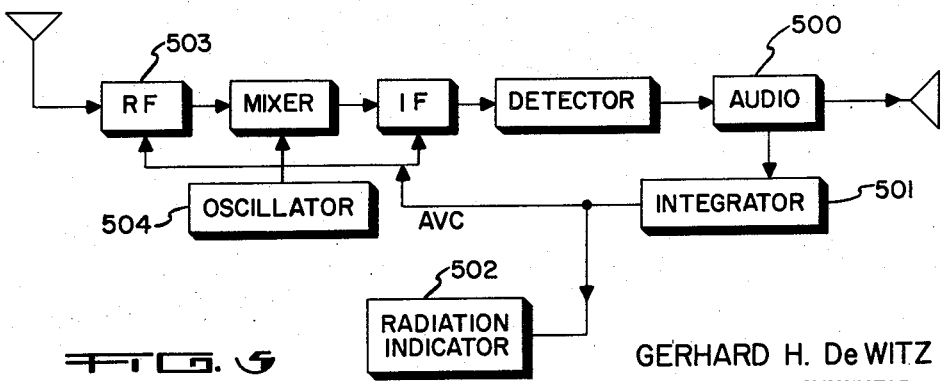
Figure 5 is a block diagram of a radio receiver and radiation detector combination according to the present invention.

In Figure 5 the elements of a conventional receiver are shown in block form. In addition, audio amplifier portion 500 is shown connected to an integrator 501. The output of integrator 501 consists of an automatic volume control D. C. voltage which is fed to the R. F. and I. F. portions of the receiver. Radiation indicator 502 is also coupled to the output of integrator 501. Any one of the radiation detectors shown in Figures 2, 3 or 4 may be inserted in the receiver circuitry either in R. F. portion 503, oscillator circuit 504, or any other convenient circuit point. If either the device of Figure 2 or that of Figure 3 is employed as the translating device of R. F. portion 503 or oscillator portion 504, noise pulses received by the audio portion 500 will be integrated by integrator circuit 501 and thus provide a suitable control voltage to cut off (at a predetermined threshold) the incoming radio signal in the presence of a dominant radiation impulse level. In addition, integrator 501 serves to provide a voltage to drive radiation indicator 502, so that the observer may visually determine the contamination in his vicinity.

A simplified embodiment of the present invention would eliminate the control voltage connection, integrator 501, and radiation indicator 502 of Figure 5, and would simply provide that the operator de-tune the receiver in order to audibly check for possible nuclear radiation nearby.

The present invention suggests innumerable embodiments. Any resistor used in an I. F. amplifier, mixer, or oscillator which effects either amplitude or frequency may be replaced by a photo-diode having a resistance when not subject to radiation equivalent to that of the supplanted resistor. An alternate approach would be to employ a photo-diode in the feed-back circuit of the oscillator to accomplish either augmentation or complete cancellation of the oscillator output signal. Yet another approach to the problem would be to utilize the common property of photo-diodes which is the variation of inherent resistance in the presence of atomic radiation. The application would involve employing a photo-diode in any of the receiver stages to cause the chosen stage to regenerate and produce oscillations during the impingement of radiation. Still another approach would be to utilize the radiation sensitive element in any of the receiver's various coupling circuits, as hereinbefore indicated.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. Apparatus for receiving radio frequency electromagnetic waves and for simultaneously detecting the presence of nuclear radiation, said apparatus including, in combination: radio frequency electromagnetic wave receiving apparatus having a plurality of intercoupled translating devices including an R. F. amplifier, a mixer having first and second input terminals and an output terminal, a local oscillator coupled to said first input terminal, said R. F. amplifier coupled to said second input terminal, an I. F. amplifier coupled to said output terminal, a detector coupled to said I. F. amplifier, an audio amplifier coupled to said detector, and an audible indicator coupled to said audio amplifier, at least one of said translating devices including a transistor and having the characteristic of being sensitive simultaneously to nuclear radiation and to wave signal energy, said at least one device being exposable to a particle-permeable area contiguous therewith; a pulse integrator coupled to said audio amplifier; a radiation indicator coupled to said pulse integrator; and the output from said pulse integrator being further coupled to the respective inputs of said R. F. amplifier and said I. F. amplifier to provide automatic control effects.

2. Apparatus according to claim 1 in which said transistor consists of a radiation sensitive transistor.

3. Apparatus according to claim 1 in which said at least one device includes a radiation-sensitive, scintillation-producing element and said transistor consists of a light sensitive transistor associated with said element.

References Cited in the file of this patent

UNITED STATES PATENTS

| 1,997,991 | Barden | Apr. 16, 1935 |
| 2,640,901 | Kinman | June 2, 1953 |
| 2,647,957 | Mallinckrodt | Aug. 4, 1953 |
| 2,670,441 | McKay | Feb. 23, 1954 |
| 2,678,400 | McKay | May 11, 1954 |

OTHER REFERENCES

"Scintillation Counter for the Detection of Alpha Particles," by Sherr: Review of Scientific Instruments, vol. 18, No. 10, October 1947; pages 767 to 770.

U. S. Atomic Energy Commission; RECD #2310, September 21, 1948; The Use of Broadcast Receivers as Radio Active Indicators, by Schafer.